Figure 1:
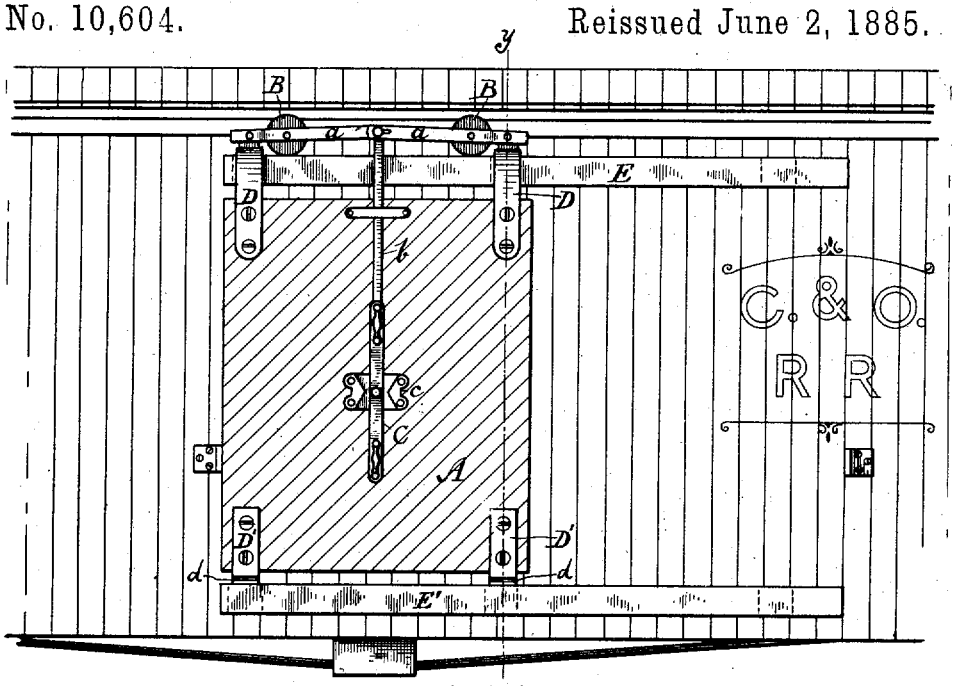

2 Sheets—Sheet 1.

E. Y. MOORE.

SLIDING CAR DOOR.

No. 10,604. Reissued June 2, 1885.

Witnesses:
J. B. Halpenny.
Geo. H. Harbach.

Inventor:
Edward Y. Moore
By F. F. Warner
his atty.

E. Y. MOORE.

SLIDING CAR DOOR.

No. 10,604. Reissued June 2, 1885.

Witnesses:
J. B. Halpenny.
Geo. H. Halbach.

Inventor:
Edward Y. Moore
By F. T. Warner
his atty.

UNITED STATES PATENT OFFICE.

EDWARD Y. MOORE, OF EVANSTON, ILLINOIS.

SLIDING CAR-DOOR.

SPECIFICATION forming part of Reissued Letters Patent No. 10,604, dated June 2, 1885.

Original No. 286,470, dated October 9, 1883. Application for reissue filed January 12, 1885.

*To all whom it may concern:*

Be it known that I, EDWARD Y. MOORE, of Evanston, in the county of Cook and State of Illinois, have invented certain new and useful Improvements in Sliding Car-Doors; and I do hereby declare that the following specification, taken in connection with the drawings furnished and forming a part thereof, is a clear, true, and complete description of my invention.

My said improvements are applicable to doors which are hung or mounted by means of pulleys and rails, and which involve an initial lifting or raising of the door by means of a hand-lever preparatory to opening or closing said door. As ruling types of door-hangers of the class referred to I will cite those disclosed in the Letters Patent of Earle, Reissue No. 9,679, April 19, 1881, and in the prior Letters Patent of Waterhouse, March 22, 1870, No. 101,194. So far as my knowledge extends, no sliding doors provided with hangers of this class have been heretofore so constructed and organized with reference to the coincident faces of the door-jambs or to the coincident adjacent wall-surfaces that after the terminal movement in closing the door it would be automatically moved toward and forced into close contact with said coincident surfaces for making a practically tight joint therewith, and to accomplish that end is one of the objects of my present invention. I also aim to provide improved means for facilitating the opening and closing of doors of this class.

My said improvements are of general value in connection with any outside sliding door; but they are of prime value for use in connection with close railway freight-cars, from which it is deemed important to exclude dust, drafts of air, (as in ice-cars and car-refrigerators,) and especially to exclude such cinders or sparks as are liable to, and frequently do, ignite combustible freight.

Broadly stated, my invention consists in the combination, with a sliding door and its lifting mechanism, regardless of its specific character, of automatic lateral clamping devices, preferably inclined wedge or cam surfaces and their abutments, by which the door, when lowered, is automatically forced toward the doorway, caused to closely engage with surfaces coincident with the surface of the door, and firmly clamped or held in that position. These clamping cam-surfaces and their abutments are preferably located both at the top and the bottom of a door for obtaining desirable results, and such may be advantageously supplemented by others located centrally at one edge of the door.

My invention also consists in certain improvements in the lifting mechanism, substantially as hereinafter set forth.

To more particularly describe my invention, I will refer to the accompanying drawings, in which—

Figure 2:
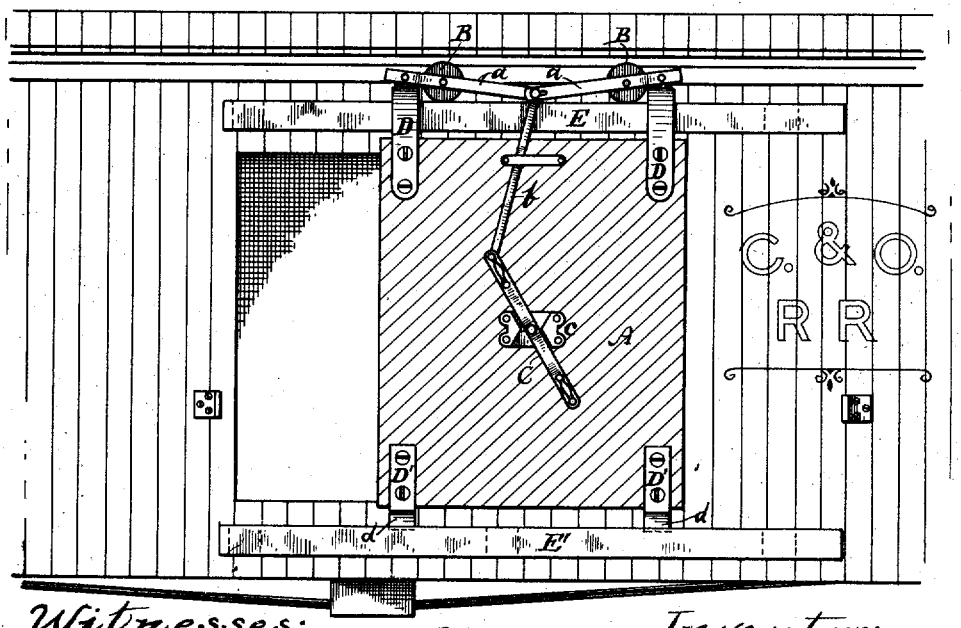
Figures 3, 4, 5:
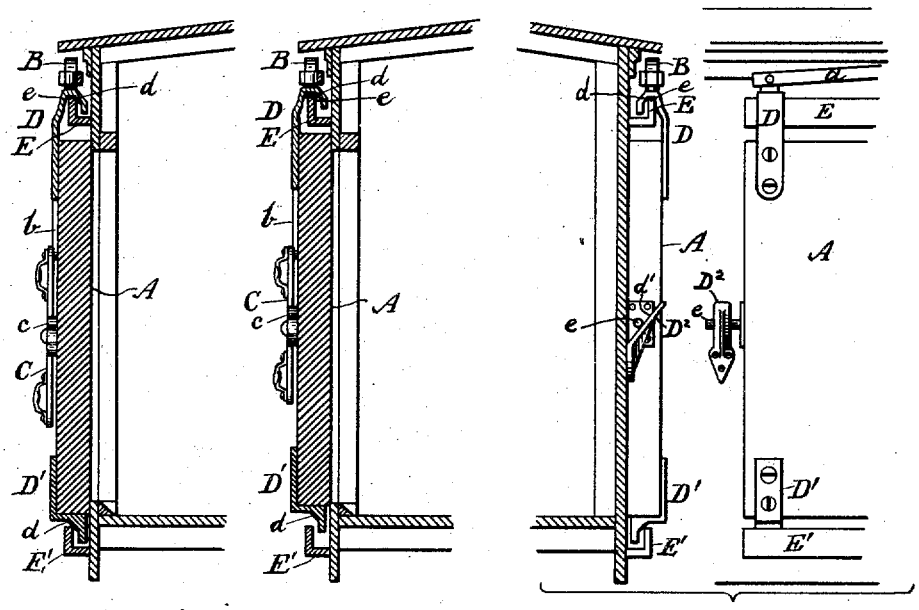

Figure 1 represents in side view a portion of a freight-car with a sliding door and my improvements applied thereto. Fig. 2 is a like representation showing the door while being opened, and the parts are represented in their correspondingly changed positions. Fig. 3 is a vertical sectional view of the same on line *y*, with the door lifted as in the act of opening or closing. Fig. 4 is a similar view with the door dropped, as when closed or at rest. Fig. 5 is a side and edge view of so much of a door as is necessary to illustrate a cam-surface and its abutment applied at the front edge of the door.

In illustrating my invention I have selected a suspended door, A; but it is to be understood that the rollers B and their levers *a* might as well be located at the bottom of the door as at the top. However said door may be mounted so as to roll and slide, there must be involved some means by which the door is initially lifted or raised preparatory to sliding. As here shown, I employ a hand-lever, C. The lever C is pivoted centrally, in the example shown, to a plate, *c*, rigidly attached to the door and jointed or pivoted to a link, *b*, which latter is also jointed or pivoted to the levers *a a*; but the hand-lever may be pivoted directly to the door. The straps D, to which the roller-levers *a* are pivoted, have each at their upper ends an inner inclined cam or wedge surface, *d*, which, when the door is lifted, is free from engagement with the adjacent abutment, *e*, which in this case is the inner upper surface of the roller-rail E; but this latter may well be supplemented at the proper points by wedge-shaped or pointed blocks, as indicated in dotted lines, with which said surfaces *d* will have a greater area of contact, and thereby render the portions in contact more durable than when the edge of the roller-rail is alone relied upon.

It will be seen that in lieu of the straps D, serving also as pivotal connections for the roller-levers, I can employ extra similarly-shaped pieces of metal provided with the wedge or cam surface *d* for operating as clamping devices and obtaining the ends desired, although on the score of economy it is obviously better to employ the straps with their double function, as described. At the bottom of the door the clamping devices are provided with the depending wedge having the cam-surfaces *d*, which are developed upon integral depending portions of the angle-plates D′, bolted or otherwise secured to the door, and said wedge or cam surfaces so engage with the inner upper edge of the bottom rail, E′, as to force the door inward toward the coincident surface of the car when said door is not lifted by means of the hand-lever.

While the bottom rail, E′, in a general way serves a good purpose for guiding the lower edge of the door, it is obvious that only so much thereof as engages with the adjacent wedge-surfaces *d* when the door is closed can serve in the clamping operation as abutments with which said wedges can engage for forcing the door inward and firmly clamping it when closed, and therefore, for my purposes, separate abutments might be used, and the bottom rail dispensed with; but in this case it would be desirable that a wedge-shaped rail be applied to the bottom of the door.

It is obvious that the same clamping effect will be obtained if the relative positions of the cam or wedge surfaces and their abutments be reversed, and that can be done without departure from my invention—as, for instance, the roller-rail E or the bottom rail, E′, at the proper points may have a wedge-shaped lug attached to their inner surfaces, in which case vertically-depending abutments might well be employed in lieu of the inclined strap and the depending wedge described. It is also obvious that the door need have no special depending abutment, but may, at its lower front edge, itself engage with the inclined inner surface of a bottom rail, otherwise like that shown.

As a supplemental aid in more firmly clamping the closed door, as described, a bracket, D², as seen in Fig. 5, may be employed, projecting from the side of the car, and having an open-topped vertical slot inclined on its outer side to afford the cam-surface, as at *d′*, and with this a simple bar projecting from the edge of the door serves as an abutment, *e*, so that when the door is lifted said bar is readily released vertically, and when lowered it engages with the inclined or cam surface *d′*, and co-operates with the upper and lower devices described for forcing the door toward the side of the car and clamping it in that position. It is obvious that such a bar may also be made to do additional duty as a bolt, which, when perforated at its outer end, could be used for securely locking the door by the insertion of the bail of a padlock larger than could be passed through the bolt-slot.

Aside from the prime value of my said improvement—*i. e.*, rendering closed car-doors cinder-proof—there are other advantages which accrue from the use thereof, as, for instance, in making up trains, if a car-door, as described, be open or closed and not bolted, it is not liable to be violently thrown to and iro while stopping or starting, or when exposed to thrusting shocks from other cars; and, again, by thus confining the doors, whether locked or otherwise, there is much less liability of wasteful wear of the hangers than when they are left loose and free to rattle, as heretofore.

It will be perceived that it will make no difference whether the upper or the lower handle of the hand-lever be seized for the purpose of raising and opening and closing the door. I have shown two handles, in order that the said lever may be operated conveniently either by a person standing on the ground or by one on the platform of the station or depot; but two handles are not essential. It will also be perceived that the door will be raised by moving the said lever in either direction. To open the door, I grasp the lever C and pull upon it in the direction in which the door opens. By so doing the hand-lever, acting through the medium of the link *b*, draws down the inner or meeting ends of the roller-levers *a a*, and the weight of the door is thus thrown upon the rollers B B, which serve as fulcrums for the levers *a a*. The door will also be lifted so that the clamping devices will be temporarily inoperative, and while the door is thus raised and freed it may be opened easily by continuing to draw or pull upon the hand-lever in the proper direction. On releasing the hand-lever the door will again be firmly clamped in place, but may easily be closed by again grasping the hand-lever and drawing it in the direction required.

I am aware that perpendicular slides have been connected to horizontal levers, and that grooved rollers have been applied to the lower ends of the said slides, the said parts operating in connection with a sliding door, and I do not, therefore, here intend to claim the same.

Having thus described my invention, it is to be understood that I believe myself to be the first to provide for the automatic lateral clamping of a sliding car-door, and that I do not, therefore, limit myself to the precise contrivances shown and described; but

I claim as new, and desire to secure by Letters Patent—

1. The combination, with a sliding car-door and mechanism for lifting and lowering it to and from its sliding position, of lateral clamping devices, substantially as described, whereby, when said door is lowered and at rest, it is automatically clamped and forced toward the coincident surface of a car, and thereby rendered tight when closed, and prevented from undue movement whether open or closed, and while the car is in motion, as set forth.

2. The combination, substantially as specified, of the sliding car-door, the levers *a a*, in connection with the door, the rollers B B, journaled in the said levers, and means for tilting the said levers, for the purposes specified.

3. The combination, substantially as specified, with each other and a sliding car-door, of the straps D D, the pivoted hand-lever C, the link *b*, the rollers B B, and the levers *a a*, for the purposes set forth.

EDWARD Y. MOORE.

Witnesses:
F. F. WARNER,
J. B. HALPENNY.